United States Patent
Burmeister et al.

(12)

(10) Patent No.: US 8,849,189 B1
(45) Date of Patent: Sep. 30, 2014

(54) WIRELESS, SELF-CONTAINED RELAY DEVICE

(75) Inventors: Aaron Burmeister, San Diego, CA (US); Narek Pezeshkian, San Diego, CA (US); Hoa G. Nguyen, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 2244 days.

(21) Appl. No.: 11/832,065

(22) Filed: Aug. 1, 2007

Related U.S. Application Data

(60) Provisional application No. 60/860,235, filed on Nov. 8, 2006.

(51) Int. Cl.
*H04B 7/15* (2006.01)
(52) U.S. Cl.
USPC ........................................................ 455/11.1
(58) Field of Classification Search
USPC ........................................................ 455/11.1
See application file for complete search history.

(56) References Cited

U.S. PATENT DOCUMENTS

| | | | | |
|---|---|---|---|---|
| 6,665,521 | B1 * | 12/2003 | Gorday et al. | 455/67.11 |
| 2006/0132643 | A1 * | 6/2006 | Chang et al. | 348/373 |

OTHER PUBLICATIONS

H. G. Nguyen, N. Pezeshkian, M. Raymond, A. Gupta, J. M. Spector; Autonomous Communication Relays for Tactical Robots; Proceedings of ICAR 2003, The 11th International Conference on Advanced Robotics Coimbra, Portugal, Jun. 30-Jul. 3, 2003.
Hoa G. Nguyen, Nathan Farrington, and Narek Pezeshkian; Maintaining Communication Link for Tactical Ground Robots; AUVSI Unmanned Systems North America 2005, Anaheim, CA, Aug. 3-5, 2004.

* cited by examiner

*Primary Examiner* — Ankur Jain
(74) *Attorney, Agent, or Firm* — SPAWAR Systems Center Pacific; Kyle Eppele; J. Eric Anderson

(57) ABSTRACT

A relay apparatus comprising a housing having a bottom surface, a radio, and a processor, both mounted within the housing. A self-righting mechanism is mounted to the housing such that the self-righting mechanism is configured to reposition the housing from any initial position to an upright position so that the housing rests on the bottom surface. The radio is configured to relay RF signals and to operate as a node in an ad hoc telecommunications network. The processor is operatively coupled to the radio and the self-righting mechanism.

10 Claims, 10 Drawing Sheets

WIRELESS, SELF-CONTAINED RELAY DEVICE

CROSS-REFERENCE TO RELATED APPLICATION

This application claims the benefit of U.S. Provisional Application 60/860,235, filed 8 Nov. 2006, entitled, "Communications Relay Brick and Deployer." This application is also related to U.S. application Ser. No. 11/832,103, filed EVEN DATE, entitled "Relay Device Deployer System".

FEDERALLY-SPONSORED RESEARCH AND DEVELOPMENT

This invention (Navy Case No. 98480) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case Number 98480.

BACKGROUND OF THE INVENTION

Maintaining communications between mobile platforms in non-line-of-sight conditions can be problematic. Buildings, trees, hills, and other obstructions negatively reflect, distort, and/or absorb radio signals. A need exists for a wireless, non-line-of-sight, high-bandwidth deployable relay device.

BRIEF DESCRIPTION OF THE DRAWINGS

Throughout the several views, like elements are referenced using like references.

DETAILED DESCRIPTION OF EMBODIMENTS

Glossary of Terms

Figure 1:
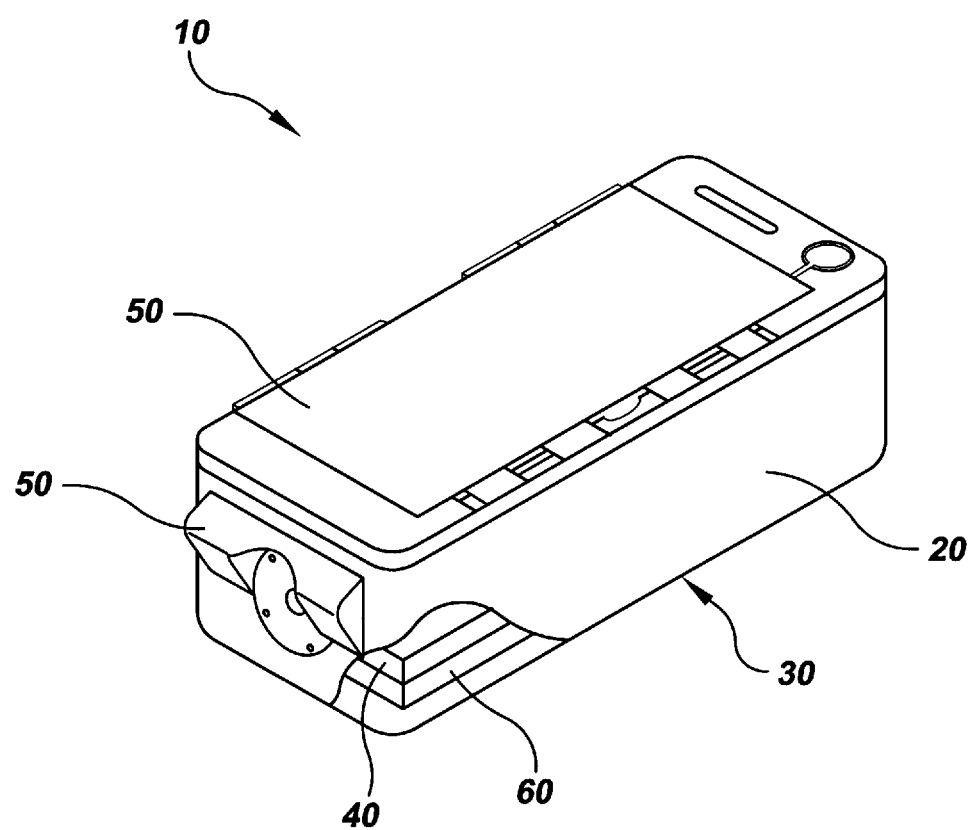
FIG. 1 shows an embodiment of a relay device.

ABS: Acrylonitrile butadiene styrene
GPS: Global positioning system
LED: Light-emitting diode
LOS: Line-of-sight
RF: Radio frequency
SRM: Self-righting mechanism
USB: Universal serial bus FIG. 1 shows one embodiment of a relay device 10. The housing 20 of the relay device 10 has a bottom surface 30 on which the housing 20 may rest. The relay device 10 also comprises a radio 40, a self-righting mechanism (SRM) 50 and a processor 60. The radio 40 is configured to relay RF signals 42 and to operate as a node in a telecommunications network, as described in greater detail hereafter with regards to FIG. 9. The radio 40 may be any radio capable of operating as a node in an ad hoc telecommunications network. For example, the radio 40 may be, but is not limited to, a PC Card 802.11b radio. Although the housing 20 is shown in FIG. 1 as being a generally rectangular prism, it is to be understood that the housing 20 may be any size or shape having sufficient internal volume to house the radio 40, and the processor 60. The housing 20 may be constructed of any material capable of forming a water-tight compartment to house the radio 40, and the processor 60. Example materials of which the housing 20 may be made include, but are not limited to: steel, titanium, aluminum, carbon fiber, fiberglass, thermoset plastic, and thermoplastic such as acrylonitrile butadiene styrene (ABS). The SRM 50 may be any mechanism incorporated into the relay device 10 that is capable of righting the relay device 10 from any initial position. The processor 60 is mounted within the housing 20 and is operatively coupled to the radio 40 and the SRM 50. The processor 60 may be any processor capable of enabling the radio 40 to operate as a node in an ad hoc telecommunications network. For example, the processor 60 may be, but is not limited to, a small single-board computer such as Bright Star Engineering's™ nanoEngine™, utilizing Intel's® StrongARM™ processor. In one embodiment, the relay device 10 may be powered by Li-ion batteries with onboard high-efficiency DC-DC converters, all mounted within the housing 20.

Figure 2:
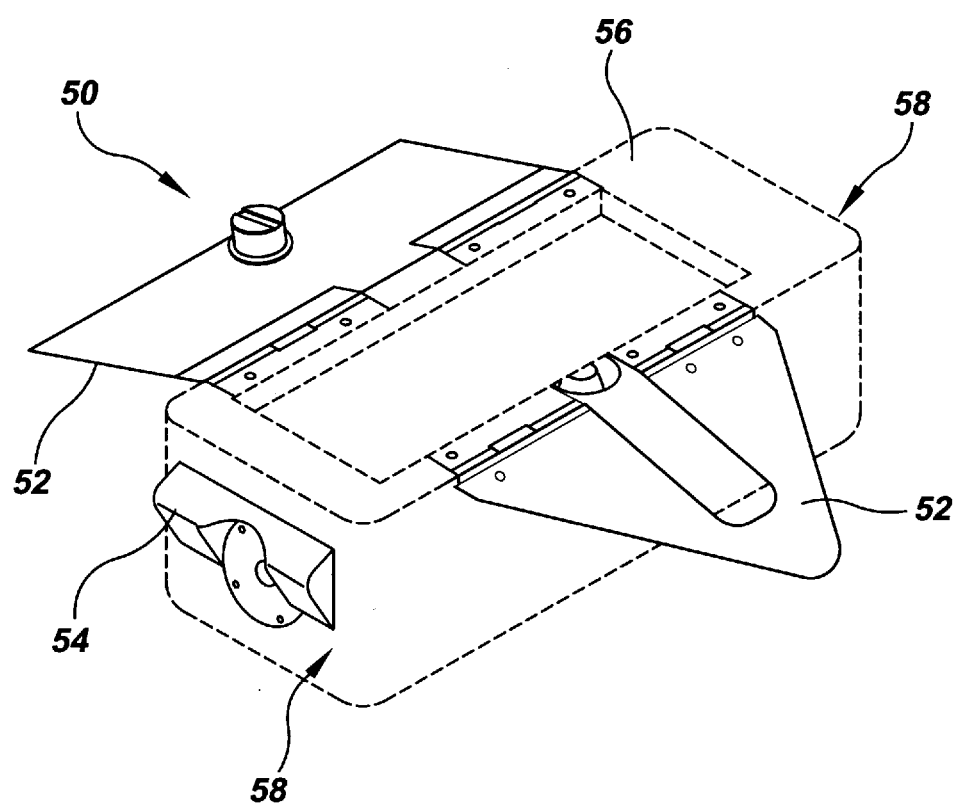
FIG. 2 shows an embodiment of a self-righting mechanism.
Figure 3:
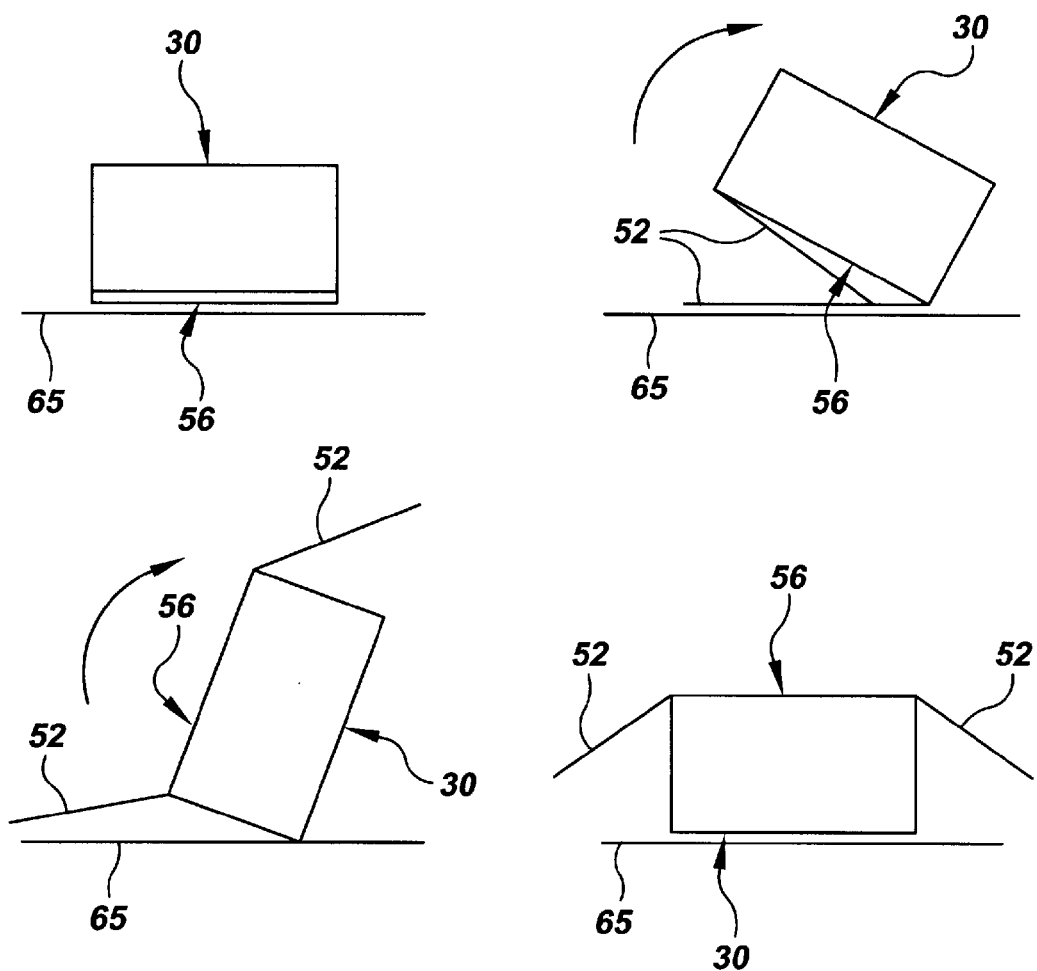
FIG. 3 shows the relay device self-righting itself.

FIG. 2 shows one embodiment of the SRM 50 where the SRM 50 comprises repositioning arms 52 and geometric constraints 54. In the embodiment shown in FIG. 2, the repositioning arms 52 are mounted to the housing 20 by hinges on opposite outer edges of an upper surface 56 of the housing 20. The repositioning arms 52 have a closed position, as shown in FIG. 1, where one repositioning arm 52 lies flush with the upper surface 56 of the housing and the second repositioning arm 52 lies underneath the first repositioning arm 52. In this embodiment, the hinges of the repositioning arms 52 are spring-loaded such that when released from their closed position, the repositioning arms 52 force the housing 20 to come to rest on its bottom surface 30 by interacting with the support surface 65 on which the housing 20 rests, as shown in FIG. 3. In the embodiment depicted in FIG. 2, the housing 20 is generally a right rectangular prism and further comprises two end surfaces 58 that are perpendicular to the axis of rotation of the hinges of the repositioning arms 52. The geometric constraints 54, as shown in the embodiment of FIG. 2, are protrusions mounted to the end surfaces 58 that prevent the relay device 10 from resting on either of its end surfaces 58. For example, if the relay device 10 is dropped from a land or surface-water based mobile platform, such as a person, an animal, a manned vehicle, an unmanned vehicle, or a water craft, the SRM 50 is configured to reposition the housing 20 from any initial position to an upright position. In the upright position, the bottom surface 30 of the housing 20 rests on the support surface 65. The support surface 65 may be the ground, the floor of a building, the surface of the water, or any other surface capable of supporting the relay device 10.

FIG. 3 is a series of front-view drawings showing an embodiment of the relay device 10 righting itself from an upside down position. In FIG. 3, the relay device 10 starts from an initial position where the upper surface 56 rests on the support surface 65. Upon a command from the processor 60, the spring-loaded repositioning arms 52 are released and push the relay device 10 into an upright position with the bottom surface 30 resting on the support surface 65. The SRM 50 is not limited to the embodiment shown in FIG. 3, but may be any mechanism incorporated into relay device 10 that is capable of righting the relay device 10 from any initial position.

Figure 4:
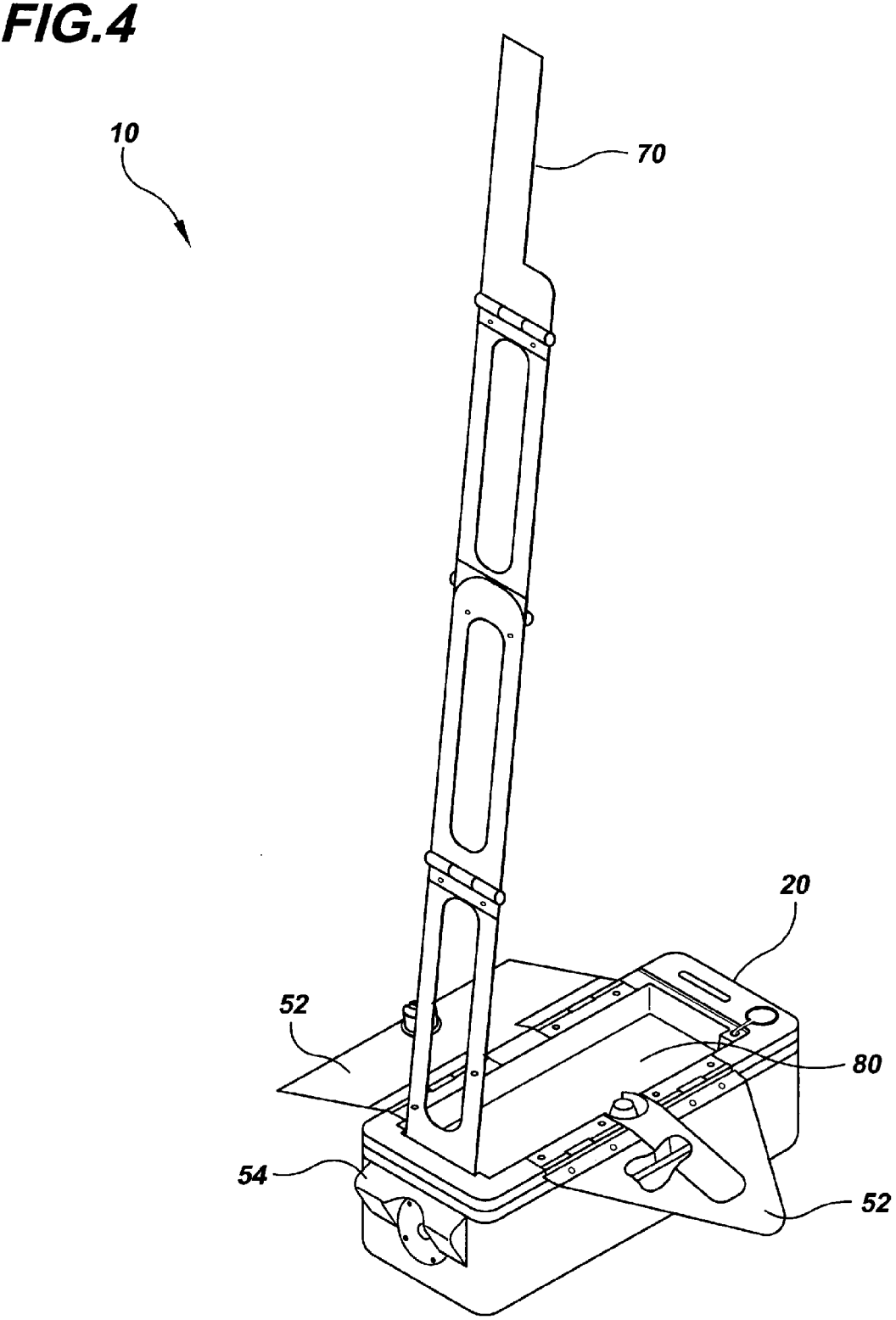
FIG. 4 shows an embodiment the relay device with an extended antenna.

FIG. 4 shows an embodiment of the relay device 10 further comprising an extendable antenna 70 in an extended position. The antenna 70 is operatively coupled to the radio 40. The antenna 70 may be any antenna capable of receiving and transmitting signals over a telecommunications network. In the embodiment of the relay device 10 shown in FIG. 4, the antenna 70 is separated into four hinged segments. Each hinged segment is connected to the adjoining segment by a spring-loaded hinge. An antenna bay 80 for stowing the antenna 70 is also shown in FIG. 4. In the embodiment shown in FIG. 4, the repositioning arms 52 also act as bay doors configured to enclose the collapsed antenna 70 in the antenna bay 80. Once the spring-loaded bay doors/repositioning arms 52 have been released from a collapsed position, as described below, the relay device 10 rights itself and the spring-loaded antenna 70 extends itself into the extended position as shown in FIG. 4.

Figure 5:
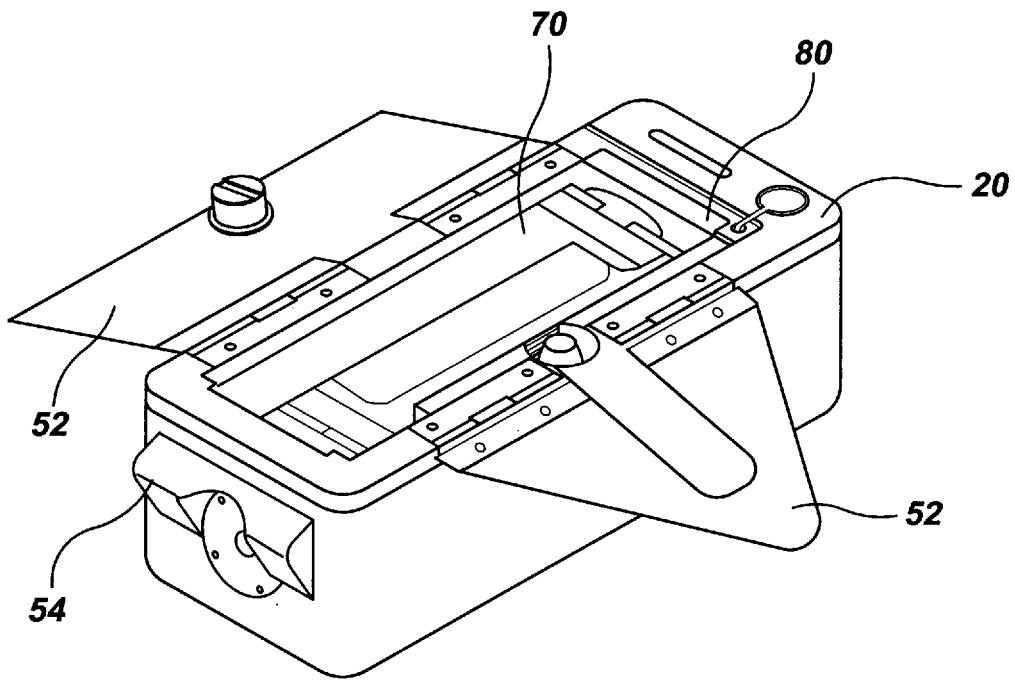
FIG. 5 shows an embodiment the relay device with a collapsed antenna.

FIG. 5 shows the antenna 70 in the collapsed position in the antenna bay 80. Although the antenna 70 is shown in FIGS. 4 and 5 as comprising four, spring-loaded segments, it is to be understood that the extendable antenna 70 may be any antenna, of any design, that is capable of being extended from a collapsed position inside the housing 20 to an extended position outside of the housing 20. Example embodiments of the antenna 70 include, but are not limited to, monopoles, dipoles, fractals, and antenna arrays.

Figure 6:
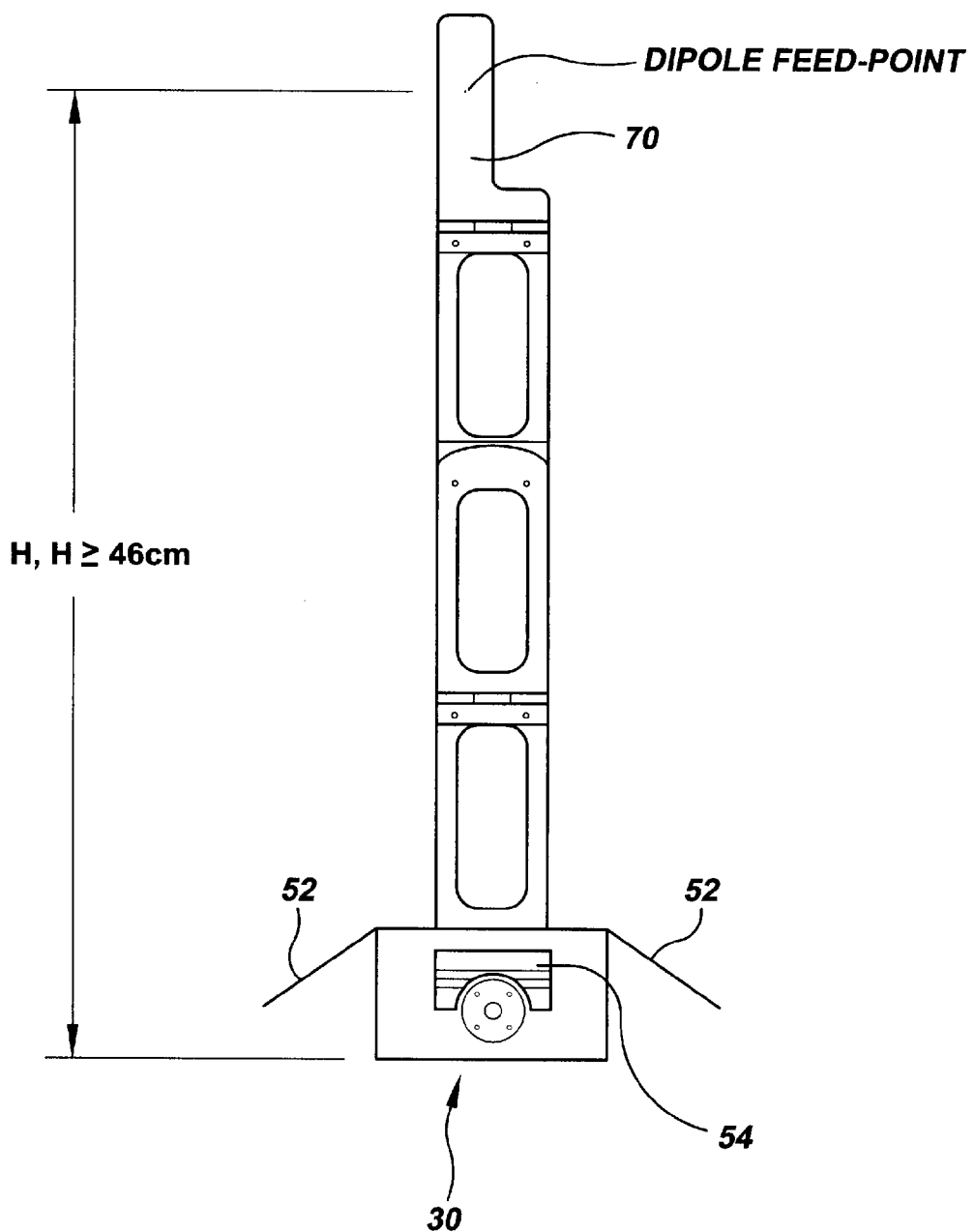
FIG. 6 shows an end view of the relay device.

FIG. 6 shows one embodiment of the relay device 10 where the antenna 70 is a dipole antenna with a height H (defined as the distance from the dipole feed-point to the support surface 30) that is greater than or equal to about 46 centimeters (18 inches). For example, the antenna 70 may be a half-wavelength antenna with a 2 dBi gain and a height H of about 50 centimeters (about 20 inches). In the latter example, the coupling strength between the antenna 70 and another network node about 400 meters (about 437 yards) away would exceed about −114 dBm.

Figure 7:
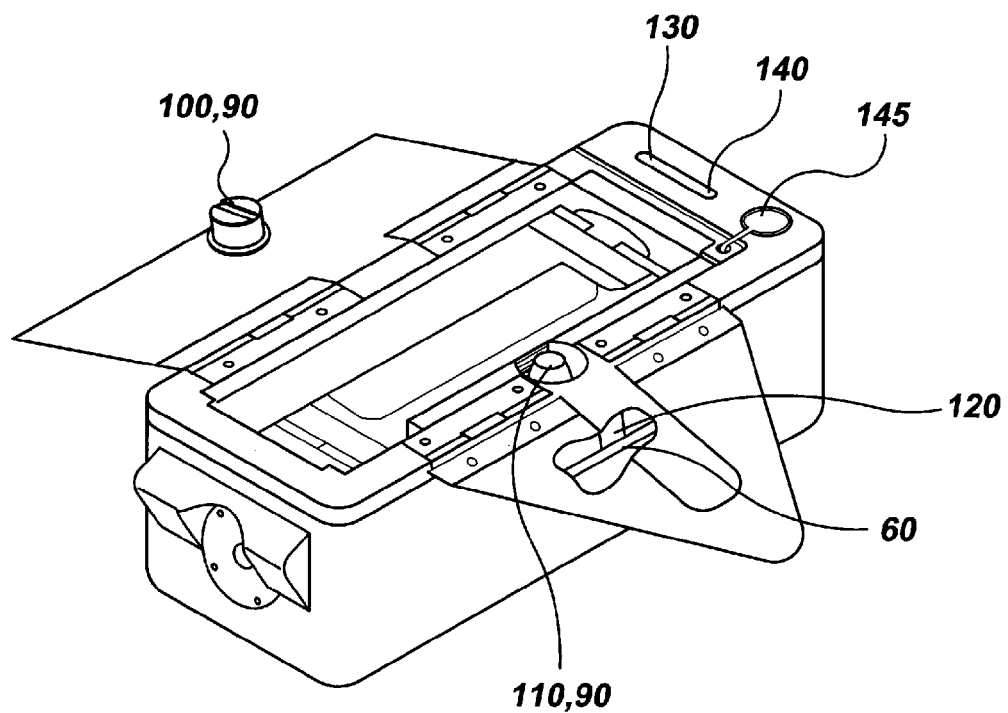
FIG. 7 shows an embodiment of a bay door latch for the relay device.

FIG. 7 depicts an embodiment of the relay device 10 further comprising a latch 90 controlled by processor 60. The latch 90 is configured to hold the repositioning arms 52 in the closed position until the processor 60 instructs the latch 90 to release the repositioning arms 52. In the embodiment shown in FIG. 7, the latch 90 comprises a receiver 100 and a servo-controlled barb 110. In this embodiment, the barb 110 is configured to slip out of the receiver 100 when the barb 110 is twisted 90° by the servo 120. The latch 90 may be any latching device that is capable of releasing the repositioning arms 52 upon a command from the processor 60. Also shown in FIG. 7, are a status display 130, a user interface 140, and an electrical interface 145. The user interface 140 is operatively coupled to the processor 60 and is configured to allow a user to manually shut down, power up, and check the status of the relay device 10. Information regarding the status of the relay device 10 is conveyed to a user via the status display 130 that is operatively coupled to the processor 60. The status display 130 may be any device capable of visually, audibly, and/or tangibly conveying status information to a user. For example, the status display 130 may be a bank of light-emitting diodes (LEDs) configured to illuminate various patterns indicative of varying status levels of the relay device 10. The user interface 140 may be any means that is capable of allowing a user to send a signal to the processor 60. For example, one embodiment of the user interface 140 may be a momentary switch, as shown in FIG. 7. The user interface 140 and the status display 130 may be located anywhere on the relay device 10 such that a user can access them when the repositioning arms 52 are in the closed position. The electrical interface 145 is mounted in the housing 20 and is operatively connected to the processor 60 and the batteries of the relay device. The electrical interface 145 facilitates recharging of the batteries, and also includes a serial port configured to allow an external computer to communicate with the processor 60.

Figure 8:
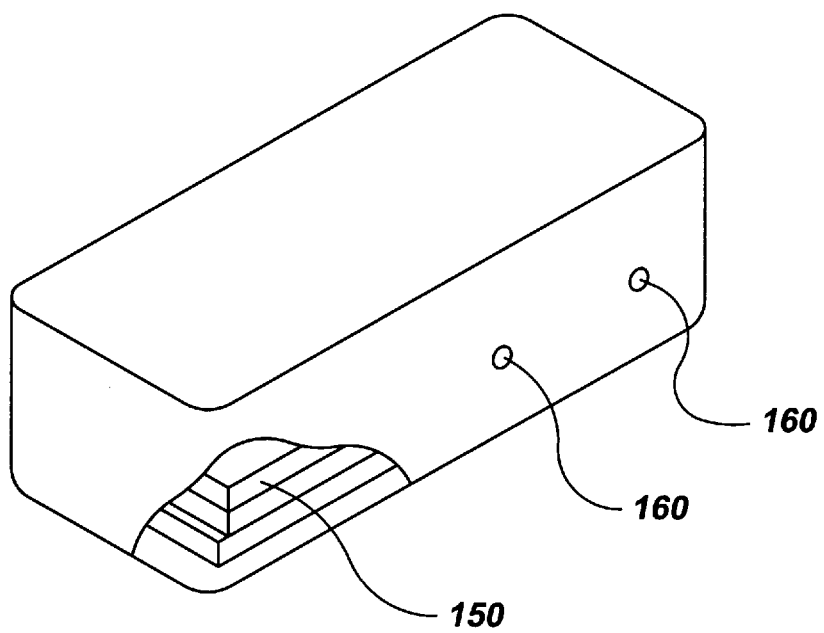
FIG. 8 shows an embodiment the relay device with environmental sensors and an incorporated GPS device.

FIG. 8 shows an embodiment of the relay device 10 that further comprises a global positioning system (GPS) receiver 150 electrically coupled to the processor 60. Information obtained from the GPS receiver 150 may be collected by the processor 60 and transmitted by the radio 40. FIG. 8 also shows environmental sensors 160 operatively configured to relay situational awareness information to the processor 60. The environmental sensors 160 may be any sensors that produce a signal upon detecting some change in the environment. Examples of environmental sensors 160 include, but are not limited to, cameras, heat sensors, motion detectors, infrared detectors, and chemical agent detectors. The GPS receiver 150 and the environmental sensors 160 may be mounted inside the housing 20 in a water-tight compartment, as shown in FIG. 8.

Figure 9:
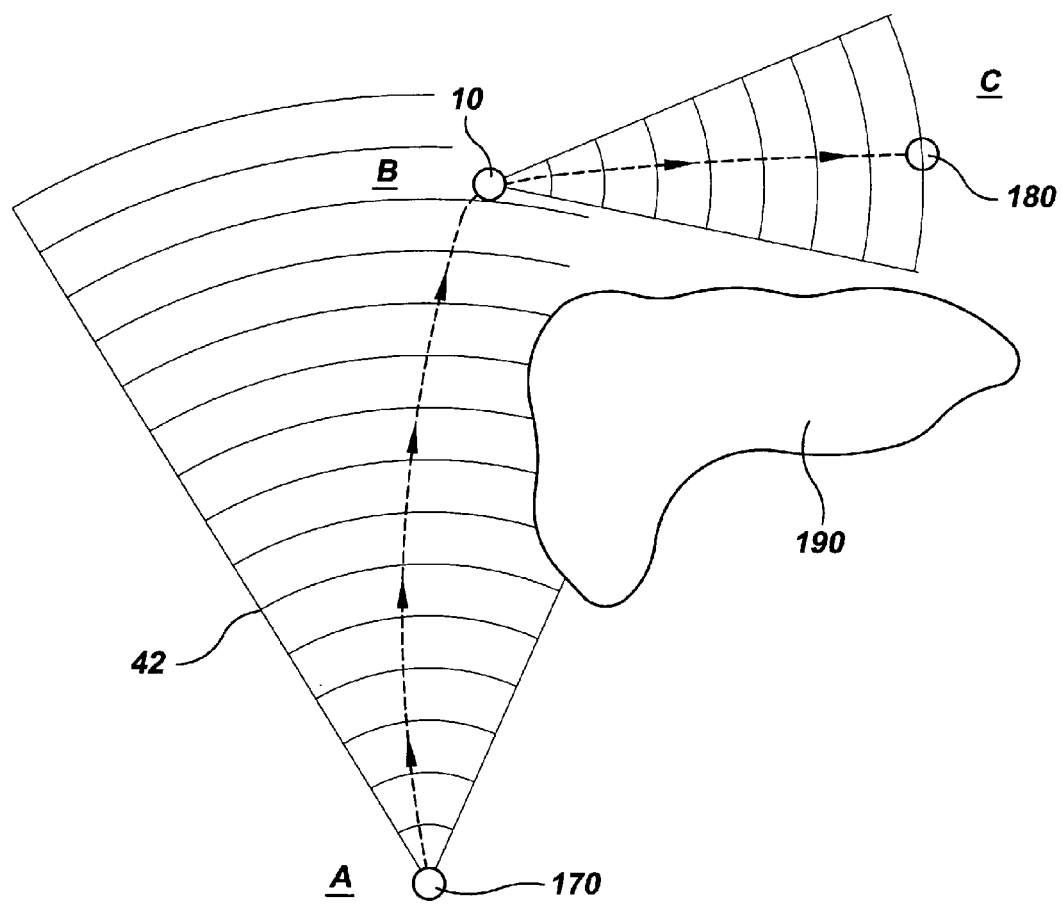
FIG. 9 shows the relay device relaying RF signals to a mobile platform.

FIG. 9 shows an illustration of one embodiment of how the relay device 10 may be used in practice to maintain radio communication between a base station 170 and a mobile platform 180. The mobile platform 180 may be any land or water-surface-based platform capable of locomotion. Examples of the mobile platform 180 include, but are not limited to the following: a human; an animal; land-based vehicles, both manned and unmanned (autonomous & radio-controlled); and water craft, both manned and unmanned (autonomous & radio-controlled). The base station 170 may be any stationary or mobile site capable of being a node in a telecommunications network. For example, the base station 170 may be a user with a man-portable control center. In another example, the base station 170 may be a control center in a building. The mobile platform 180 traveling from position A towards position B maintains LOS communications with the base station 170. However, as the mobile platform 180 begins to travel from position B to position C, radio communications begin to be obstructed by obstacle 190. Example embodiments of obstacle 190 include, but are not limited to, buildings, trees, hills, or any other physical or nonphysical obstructions that negatively reflect, distort, and/or absorb radio signals. FIG. 9 shows how a relay device 10 may be placed in the vicinity of position B to allow the mobile platform 180 to continue around obstacle 190 towards position C without losing radio connectivity with the base station 170. The relay device 10 may also be ruggedized such that the relay device 10 continues to function properly after being subjected to shock forces resulting from a fall from the mobile platform 180. For example, the relay device 10 may be capable of withstanding about 125 gs.

Figure 10:
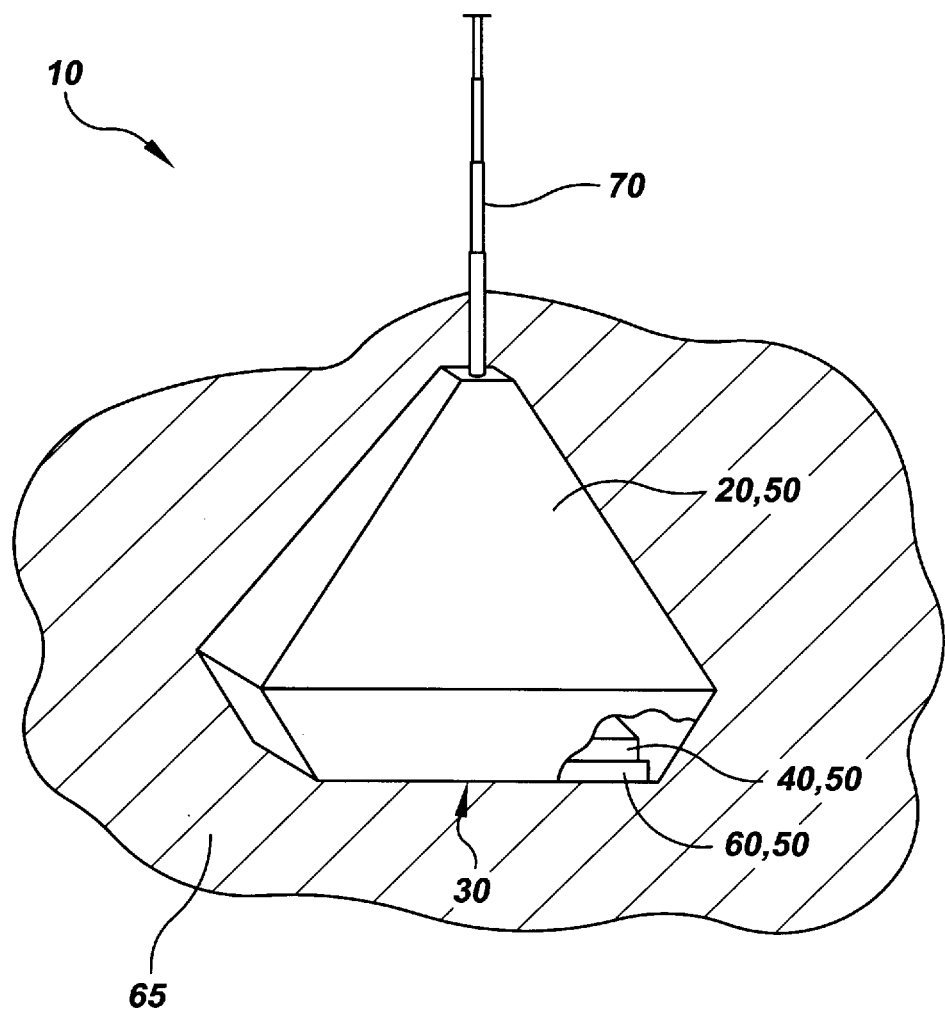
FIG. 10 shows another embodiment of the relay device.

FIG. 10 shows another embodiment of the relay device 10. The self-righting mechanism 50 in this embodiment is a combination of the shape of the housing 20 and the placement of the processor 60 and the radio 40. With the processor 60 and the radio 40 being mounted inside the housing 20 near the bottom surface 30, the shape of the housing 20 causes the relay device 10 to rest on a support surface 65 in an upright position in the presence of gravitational forces. In this embodiment, the extendable antenna 70 is shown as a telescoping antenna in a fully extended position. In its collapsed position, the antenna 70 may fit inside the housing 20. The antenna 70 may be internally spring-loaded. This embodiment of the relay device 10 may be watertight, float on a liquid support surface 65, or rest on a solid support surface 65.

From the above description of the relay device 10, it is manifest that various techniques may be used for implementing the concepts of relay device 10 without departing from its scope. The described embodiments are to be considered in all respects as illustrative and not restrictive. It should also be understood that the relay device 10 is not limited to the particular embodiments described herein, but is capable of many embodiments without departing from the scope of the claims.

We claim:

1. A relay apparatus comprising:
a housing having a bottom surface;
a radio mounted within the housing, wherein the radio is configured to relay RF signals and to operate as a node in a telecommunications network;
a self-righting mechanism mounted to the housing such that the self-righting mechanism is configured to reposition the housing from any initial position to an upright position such that the housing rests on the bottom surface;
a processor mounted within the housing and operatively coupled to the radio and the self-righting mechanism;
an extendable antenna operatively coupled to the radio, wherein the antenna has an extended position and a retracted position and wherein the antenna is configured to extend in a direction away from the bottom surface; and
wherein the housing further comprises an antenna bay configured to stow the antenna, wherein the self-righting mechanism comprises two bay doors, each hingedly connected to opposite, outer edges of the antenna bay, and wherein the two bay doors, upon a command from the processor, are configured to move to an open position thereby constraining the housing to rest on the bottom surface.

2. The relay apparatus of claim 1, wherein the housing is in the shape of a right rectangular prism and further comprises two end surfaces that are perpendicular to an axis of rotation of the bay doors, wherein each end surface comprises a protrusion for geometrically constraining the housing not to rest on the end surfaces.

3. The relay apparatus of claim 2, wherein the antenna is a dipole antenna with a feed-point that is separated from the bottom surface by at least about 46 centimeters.

4. The relay apparatus of claim 3, further comprising a processor-controlled latch configured to releasably hold the bay doors in a closed position, wherein the bay doors are spring loaded.

5. The relay apparatus of claim 4, wherein the antenna is segmented and each segment of the antenna is spring hinged such that the antenna self-extends when the bay doors open.

6. The relay apparatus of claim 5, wherein the radio, and the processor are mounted within a watertight compartment of the housing.

7. The relay apparatus of claim 6, wherein the relay apparatus is ruggedized to resist shock forces up to 125 gs.

8. The relay apparatus of claim 7, further comprising a status display in the housing and a user interface operatively coupled to the processor.

9. The relay apparatus of claim 8, wherein the user interface is configured to allow a user to manually shut down, power up, and check a status of the relay apparatus.

10. The relay apparatus of claim 9, further comprising an electrical interface mounted to the housing and operatively coupled to the processor, wherein the electrical interface is configured to allow an external computer to communicate with the processor.

\* \* \* \* \*